Patented Aug. 11, 1931

1,818,904

UNITED STATES PATENT OFFICE

RICHARD H. MARTIN, OF WORCESTER, MASSACHUSETTS, ASSIGNOR TO NORTON COMPANY, OF WORCESTER, MASSACHUSETTS, A CORPORATION OF MASSACHUSETTS

SILICON CARBIDE REFRACTORY ARTICLE AND METHOD OF MAKING THE SAME

No Drawing. Original application filed April 18, 1925, Serial No. 24,277, now Patent No. 1,653,918, dated December 27, 1927. Divided and this application filed July 22, 1927. Serial No. 207,816.

This invention relates to refractory articles, such as bricks, saggers and the like, which contain silicon carbide, and more particularly to a silicon carbide article having a protective coating thereon and to a method of making the same. This case is a division of my Patent No. 1,653,918 dated Dec. 27, 1927.

A refractory article containing silicon carbide tends to decompose under various high temperature conditions due generally to oxidation of the silicon carbide, which begins at a temperature of about 600° C. and takes place rapidly at temperatures above 900° C. Such decomposition materially shortens the life of the article and makes early replacement necessary. Moreover, the silicon carbide refractories are rendered unsuitable by such decomposition for use as bricks or saggers in furnaces employed for burning many of the finer wares such as china, porcelain and the like owing to the blackening or discoloration of the light colored ware by the decomposition products arising from the silicon carbide.

I have found that it is feasible to overcome this difficulty by coating the silicon carbide article with a composition which materially limits or entirely prevents decomposition under the ordinary kiln operating conditions. It is accordingly the primary object of my invention to provide a silicon carbide article which has a satisfactory coating for this purpose, as well as a method of protecting the silicon carbide, so as to obtain an article of this type which will give a long life of useful service for refractory and other purposes.

In accordance with my invention I propose to coat a silicon carbide article with a magnesium compound, such as magnesia, which is mixed with a further material containing an aluminium compound, such as alumina, as essential ingredients. These materials, when applied to a silicon carbide article and suitably fired have the capacity of uniting to form a satisfactory coating or glaze which is substantially impervious to the kiln gases and which will therefore protect the silicon carbide and retard its decomposition.

As an example of one mixture which falls within the scope of my invention, I may utilize 50% by weight of magnesia having a grain size of 150 F. (i. e., which will pass through a screen having 150 meshes to the linear inch) together with 50% by weight of alumina in a substantially pure form, or which contains but a small amount of alkali and other impurities, and which has a grain size of 120 meshes to the linear inch. This refractory mixture may be made into a slip by the addition of a suitable amount of a temporary bonding ingredient such as water to form a fluid mixture of about the consistency of cream. One or more faces of the silicon carbide article to be protected is covered with a coating of this material, which may be painted on with a brush or otherwise suitably placed thereon. Thereafter the article is dried and fired to a temperature which will cause the alumina and magnesia to combine and form a satisfactory coating. The firing operation may be carried on to about Orton cone 16 which will form a dense coating of the material that is substantially impervious to the kiln gases under ordinary operating conditions. It will be understood that the ingredients may be used in chemically equivalent amounts or other suitable proportions and that the character of the ingredients may be suitably varied within the skill of one acquainted with this art. Also the methods of compounding the mixture, applying the coating and firing the article may be as desired.

The ingredients, when first placed on the silicon carbide article, will not fully protect it until the coating mixture has been properly fused. The penetration of the kiln gases to the coated article before firing may cause a partial decomposition of the surface portions of the silicon carbide resulting in the formation of some silica or other flux which becomes an integral part of the coating and which assists in the formation of the desired dense substantially gas impervious coating or glaze. It will be apparent that other refractory materials and fluxes may be incorporated in the coating composition, but it is desirable that the two chief ingredients be magnesia and alumina. If the refractory article is to be subjected to a very high temperature in use, it may be in its coating operation fired at a much higher temperature than Orton cone 16, all of which will be apparent to one skilled in the art.

It will be apparent that the magnesia and alumina are themselves highly refractory bodies and they may combine to form a refractory substance. They may also combine with the various impurities or fluxes present in the mixture and derived from the silicon carbide. It is therefore to be understood that the terms "magnesia" and "alumina" are intended to cover such materials as may be present in the initial coating composition or which form during the firing operation, but which have magnesium and aluminium compounds as their essential ingredients.

Having thus described my invention, what I claim as new and desire to secure by Letters Patent is:

1. The method of forming a protective coating on a refractory article containing silicon carbide which comprises coating a face of the article with a compound, a considerable portion of which comprises magnesia and alumina, and thereafter appropriately firing the article to cause the magnesia and alumina to combine and form a dense coating which will protect the silicon carbide from rapid decomposition.

2. A refractory article comprising a body containing silicon carbide and a protective coating thereover composed in large part of magnesia and alumina suitably fired to form a dense coating which is substantially impervious to kiln gases under normal operating conditions.

3. A refractory article comprising a body of bonded silicon carbide granular material, and a coating thereover consisting chiefly of finely divided alumina and magnesia fired in situ at a temperature as high as Orton cone 16.

4. A refractory article comprising a body of bonded silicon carbide granular material, and a coating thereover consisting chiefly of a mixture of substantially equal parts of finely divided alumina and magnesia fired in situ to form a compound thereof.

5. A refractory article comprising a body of bonded refractory grains and a relatively thin protective coating thereover and bonded thereto composed in large part of magnesia and alumina, said protective coating being substantially impervious to kiln gases under normal operating conditions.

6. A refractory article comprising a body of bonded refractory grains and a relatively thin protective coating thereover and bonded thereto composed in large part of magnesia and alumina fired in situ at a temperature as high as Orton cone 16.

7. A refractory article comprising a body of bonded refractory grains and a relatively thin protective coating thereover and bonded thereto composed of equal parts of magnesia and alumina fired in situ at a temperature as high as Orton cone 16.

Signed at Worcester, Mass, this 19th day of July, 1927.

RICHARD H. MARTIN.